(12) United States Patent
Lee

(10) Patent No.: US 8,079,059 B1
(45) Date of Patent: Dec. 13, 2011

(54) METHOD AND SYSTEM FOR PROVIDING TERMINAL VIEW ACCESS OF A CLIENT DEVICE IN A SECURE NETWORK

(75) Inventor: Jaushin Lee, Saratoga, CA (US)

(73) Assignee: Imera Systems, Inc., San Jose, CA (US)

( * ) Notice: Subject to any disclaimer, the term of this patent is extended or adjusted under 35 U.S.C. 154(b) by 601 days.

(21) Appl. No.: 12/240,317

(22) Filed: Sep. 29, 2008

Related U.S. Application Data

(63) Continuation-in-part of application No. 11/141,767, filed on May 31, 2005, now Pat. No. 7,512,984.

(51) Int. Cl.
 H04L 29/06 (2006.01)
 G06F 7/04 (2006.01)
 G06F 15/16 (2006.01)
 G06F 17/30 (2006.01)

(52) U.S. Cl. .................. 726/1; 726/12; 726/15; 726/26; 713/153; 709/203; 709/219

(58) Field of Classification Search ................ 726/1, 12, 726/15, 26; 713/153; 709/203, 219
 See application file for complete search history.

(56) References Cited

U.S. PATENT DOCUMENTS

| | | | |
|---|---|---|---|
| 6,584,493 B1 * | 6/2003 | Butler | 709/204 |
| 6,978,308 B2 * | 12/2005 | Boden et al. | 709/229 |
| 7,032,022 B1 | 4/2006 | Shanumgam et al. | |
| 7,584,239 B1 * | 9/2009 | Yan et al. | 709/201 |
| 2001/0047406 A1 * | 11/2001 | Araujo et al. | 709/223 |
| 2003/0007464 A1 | 1/2003 | Balani | |
| 2003/0069958 A1 * | 4/2003 | Jalava | 709/223 |
| 2003/0079030 A1 * | 4/2003 | Cocotis et al. | 709/229 |
| 2004/0088423 A1 * | 5/2004 | Miller et al. | 709/229 |
| 2004/0153512 A1 | 8/2004 | Friend | |
| 2004/0230841 A1 * | 11/2004 | Savini | 713/202 |
| 2004/0250130 A1 * | 12/2004 | Billharz et al. | 713/201 |
| 2004/0268124 A1 * | 12/2004 | Narayanan | 713/164 |
| 2005/0027584 A1 * | 2/2005 | Fusari | 705/9 |
| 2005/0027818 A1 * | 2/2005 | Friedman et al. | 709/217 |
| 2005/0086533 A1 * | 4/2005 | Hsieh | 713/201 |
| 2005/0088977 A1 * | 4/2005 | Roch et al. | 370/254 |
| 2005/0114711 A1 * | 5/2005 | Hesselink et al. | 713/201 |
| 2005/0125542 A1 * | 6/2005 | Zhu | 709/227 |
| 2005/0144481 A1 * | 6/2005 | Hopen et al. | 713/201 |
| 2005/0257039 A1 * | 11/2005 | Marshall | 713/1 |

(Continued)

FOREIGN PATENT DOCUMENTS

WO 03/094011 A1 11/2003

Primary Examiner — Michael Simitoski
(74) Attorney, Agent, or Firm — Dergosits & Noah LLP

(57) ABSTRACT

Methods, computer products, and systems are described for providing terminal view access of a client device in a secure enterprise network. One method includes receiving a request from a first client device within the secure enterprise network and/or a second client device for providing terminal view access of the first and/or second client device to the second and/or first client device respectively. A security check on the request is performed to enforce a security policy of the secure enterprise network. When the security policy is satisfied, a secure data transport channel is established between the first client device and the second client device. Terminal view data corresponding to a desktop associated with the first and/or second client device is received from the first and/or second client device respectively via the data transport channel and is provided to the second and/or first client device respectively via the data transport channel.

17 Claims, 7 Drawing Sheets

U.S. PATENT DOCUMENTS

2006/0031407 A1* 2/2006 Dispensa et al. ............... 709/219
2006/0075478 A1 4/2006 Hyndman et al.
2006/0080441 A1 4/2006 Chen et al.
2006/0195895 A1* 8/2006 Ben-Shachar et al. .......... 726/11
2006/0235973 A1* 10/2006 McBride et al. ............... 709/226
2009/0217358 A1* 8/2009 Kumar et al. .................... 726/5

* cited by examiner

METHOD AND SYSTEM FOR PROVIDING TERMINAL VIEW ACCESS OF A CLIENT DEVICE IN A SECURE NETWORK

CROSS-REFERENCE TO RELATED APPLICATIONS

This application is a continuation-in-part of U.S. patent application Ser. No. 11/141,767, now U.S. Pat. No. 7,512,984 B2, filed May 31, 2005, the disclosure of which is incorporated herein by reference in its entirety.

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

BACKGROUND

Many business enterprises typically maintain sensitive digital resources, e.g., computers, confidential information, data, applications, etc., in secure data centers. An internal network of a secure enterprise network is typically protected by at least one high security firewall. Access to the internal network, and to the sensitive resources coupled thereto, is typically restricted to authorized users and authorized client devices. Such authorized client devices are typically internal client devices, that is, they are directly coupled to the internal network inside the secure enterprise network. Physical access to the internal client devices is controlled by physical means, e.g., locked doors and security personnel, and electronic access to the internal client devices is controlled by security software that authenticates and/or authorizes any user attempting to access the internal network. External access to the internal client devices and to the internal network is controlled by the high security firewalls. In a lock-down environment, especially when aiming at classified data leakage prevention, direct external access is security sensitive and typically not allowed. The access from internal client devices to external devices is selectively open.

Many large modern business enterprises have sales offices, business centers, secure data centers, and/or manufacturing sites distributed throughout the country and/or worldwide. In addition, employees of such enterprises are often mobile and not necessarily associated with an office or building controlled by the enterprise. For example, sales and service personnel regularly travel to and from customer sites, and may work from their respective residences. Some of these workers require access to their internal client devices during their travels or while working from home.

In such instances, the worker might be granted access to a virtual private network (VPN), which uses tunneling technology to establish a secure tunnel from the worker's external client device to a VPN gateway, which is deployed to the edge of the secure enterprise and connected to the internal network. The deployment of such a VPN infrastructure is complicated, because the VPN tunnel must travel over a public network, such as the Internet, then traverse through the enterprise intranet, and finally reach the internal client device of interest. In a protected intranet environment, the inbound VPN tunnel can be very intrusive, which requires open-holes in the firewalls that protect the internal client device of interest. Once a VPN infrastructure is deployed, with access to the VPN, the worker can gain remote access to the internal client device and send and receive TCP/IP network traffic. In effect, the worker's external client device becomes an internal client device with full access to the internal network and the sensitive resources connected thereto.

Because traditional tunnel-based VPN technology provides practically total network connectivity (i.e. TCP and IP) and access by remote users, serious security issues arise. For example, such unfettered access presents a potential risk of exposing proprietary information, weakening intrusion safeguards, or infecting the internal network with outside viruses. Of particular concern is the risk of "information leakage," which refers to the extraction and misappropriation of confidential data from the internal client device. Moreover, because enforcing an application policy inside a VPN tunnel is difficult, the traffic traveling within a VPN tunnel is typically unmonitored. Thus, an authorized, but malicious, external client device can introduce harmful data to the internal network and/or extract and misappropriate sensitive data without being identified.

One approach to addressing this problem involves providing the end user with a view of a resource, e.g., an internal client device, thereby restricting the end user's ability to extract and insert data. For example, a presentation server developed by Citrix Systems, Inc., and based on a terminal services tool developed by Microsoft Corporation, allows an end user to use a client device to view, but not receive, resources within a secure enterprise network. The end user can use the client device to submit control commands against the resources via the presentation server, but is not allowed to transmit data or executables stored on the client device. The presentation server returns visual data, e.g., pixel data, which when displayed, shows the result of the control command. The end user's client device effectively becomes a "thin client" with respect to the resources in the enterprise network.

While this approach gives the end user access to the resources and protects the resources from misappropriation or corruption, it was designed with the requirement of physical network connectivity across Internet and intranet firewalls where typically a VPN tunnel, as described above, needs to be deployed. In other words, this approach is an internal network solution and generally available only for users who have direct access to the presentation server, which is typically within the secure enterprise network for security reasons. As stated above, most non-affiliated users and/or remote users will not have direct access to the internal network, let alone to the presentation server. In order to allow non-affiliated users or remote users to utilize this approach, the enterprise must implement additional security measures, which require complicated infrastructure work.

For example, in one known system, shown in FIG. 1, a secure enterprise 15 includes a portal client 17, a web server 18, and a presentation server 19 behind at least one enterprise firewall 16a, 16b, 16c in a perimeter network or DMZ. The portal client 17 can be a thin client that includes a web browser and an Independent Computing Architecture (ICA) client that allows the portal client 17 to communicate with the presentation server 19 via the web server 18. An internal client device 13 can access resources 54, e.g., applications and data, in the secure enterprise 15. External client devices 12, however, generally cannot access the portal client 17 over the Internet 11 because the portal client 17 is behind the enterprise's external firewalls 16a. To address this, the external client device 12 is required to establish a VPN tunnel 20 over the Internet 11 to traverse the external firewalls 16a in order to reach the portal client 17.

While this approach is functional, it is not suitable for security-sensitive enterprises for several reasons. First, this approach requires providing VPN access to the external client device 12, which is generally undesirable when the external client device 12 and its user are not affiliated with the enterprise. Moreover, such a VPN based solution raises serious security concerns in many enterprise security practices because it requires opening ports in each firewall to allow tunnel access from inside secure enterprise to go outside 15. Moreover, such a VPN based solution is relatively complicated to deploy because it requires configuring every external client device 12 and configuring or constraining the VPN gateway to limit the access for each external client device 12. This is not feasible for large enterprises which may have thousands of employees, customers, and partners around the world.

Another disadvantage of current VPN based solutions is that the remote access to the internal client device 13 and secure resources 54 through the VPN gateway, portal client 17, and presentation server 19, typically is not monitored or recorded for auditing purposes. Such monitoring and recording is critical when non-affiliated users and/or external client devices are granted remote access to the internal client device 13 and secure resources 54. Without such monitoring and auditing capabilities, security sensitive enterprises cannot determine who accessed the network 15, which internal client devices 13 were accessed, at what time such access was granted, and/or what commands were executed. Thus, for this additional reason, the current VPN based solutions are unsuitable for security sensitive enterprises.

Another major limitation of the VPN based approaches described above is that they apply to one direction access only. That is, these approaches apply to one enterprise and one lock-downed data center only. They do not allow "reverse access" or "mesh access" among a plurality of secure enterprises that are participating in joint business projects. For example, in a modern enterprise, an employee often requires access to resources inside his/her enterprise as well as to resources behind other entities, e.g., customers, vendors, and partners, that have business level collaboration with the employee's enterprise. The VPN based approaches do not offer "reverse access" or "mesh access" as an integrated solution because if deployed, those approaches would require very intrusive infrastructure re-working and provisioning, which is highly undesirable. As a result, the existing techniques do not address the needs of a modern global business environment.

Accordingly, there exists a need for methods, systems, and computer program products for providing terminal view access to internal client devices in a secure enterprise networks in a collaborative environment. The methods, systems and computer program products should allow distributed enterprises to control their individual access policies and user authentications, while enabling secure terminal view access to internal client devices as well as devices hosted behind other enterprises. The methods, systems and computer program products should provide monitoring and recording capabilities so that changes applied to the internal network and to the internal client devices can be recorded for auditing purposes.

SUMMARY

Methods, computer readable media containing a computer program, and systems are described for providing terminal view access of a client device in a secure enterprise network. A method and a computer readable medium containing a computer program, executable by a machine, for providing terminal view access of a client device in a secure enterprise network, includes executable instructions for receiving a request from a first client device within the secure enterprise network and/or a second client device for providing terminal view access of the first and/or second client device to the second and/or first client device respectively. A security check on the request is performed to enforce a security policy of the secure enterprise network. When the security policy is satisfied, a secure data transport channel is established between the first client device and the second client device. Terminal view data corresponding to a computer desktop associated with the first and/or second client device is received from the first and/or second client device respectively via the data transport channel and is provided to the second and/or first client device respectively via the data transport channel.

In another aspect of the subject matter disclosed herein, a system for providing terminal view access of a client device in a secure enterprise network includes means for receiving a request from one of a first client device within the secure enterprise network and a second client device, the request for at least one of providing terminal view access of the first client device to the second client device and providing terminal view access of the second client device to the first client device in the secure enterprise network, and means for performing a security check on the request to enforce a security policy of the secure enterprise network. The system also includes means for establishing a secure data transport channel between the first client device and the second client device when the security policy is satisfied, wherein the data transport channel is configured to transport terminal view data and to communicatively connect the first client device and the second client device over at least one of a public network, a private network and a firewall, means for receiving terminal view data from at least one of the first client device and the second client device via the data transport channel, the terminal view data corresponding to a computer desktop associated with at least one of the first client device and the second client device, respectively, and means for providing the terminal view data received from at least one of the first client device and the second client device to at least one of the second client device and the first client device, respectively, via the data transport channel so that at least one of the second client device and the first client device is provided a visual representation of the desktop associated with at least one of the first client device and the second client device, respectively.

In another aspect of the subject matter disclosed herein, another system for providing terminal view access of a client device in a secure enterprise network includes a message receiver configured for receiving a request from one of a first client device within the secure enterprise network and a second client device, the request for at least one of providing terminal view access of the first client device to the second client device and providing terminal view access of the second client device to the first client device in the secure enterprise network, a session manager component configured for performing a security check on the request to enforce a security policy of the first secure enterprise network and for establishing a secure data transport channel between the first client device and the second client device when the security policy is satisfied, wherein the data transport channel is configured to transport terminal view data and to communicatively connect the first client device and the second client device over at least one of a public network, a private network and a firewall, and a terminal view data manager configured for receiving terminal view data from at least one of the first client device and the second client device via the data transport channel, the terminal view data corresponding to a desktop associated with at least one of the first client device and the second client device, respectively, and for providing the terminal view data received from at least one of the first client device and the second client device to at least one of the second client device and the first client device, respectively, via the data transport channel so that at least one of the second client device and the first client device is provided a visual representation of the desktop associated with at least one of the first client device and the second client device, respectively. In one embodiment, the terminal view data can be shared and multi-casted to more than one receiving client device for a collaborative purpose.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
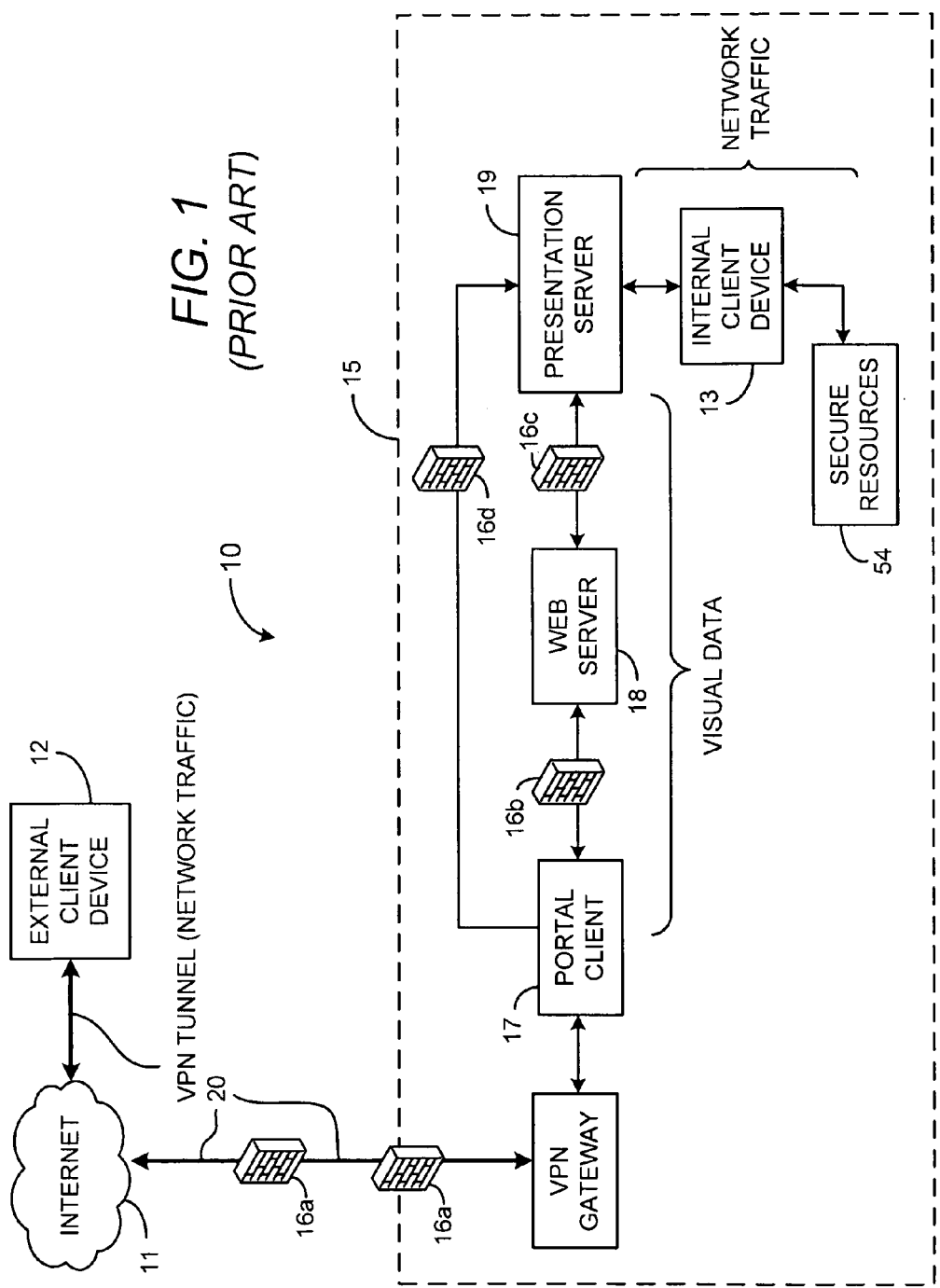
FIG. 1 is a block diagram illustrating a prior art system.

Methods, systems, and computer program products for providing terminal view access of a client device in a secure enterprise network are disclosed. In one embodiment, the secure enterprise network can be a private autonomous network protected by at least one firewall. For example, a secure enterprise network can be associated with a domain, a business enterprise, a public enterprise, and/or any other like entity. The secure enterprise network is typically coupled to a public network, such as an Internet, so that client devices within and outside of the secure network can communicate with one another. To protect the secure enterprise network from malicious or unauthorized access by entities external to the secure enterprise network, at least one firewall can be used to restrict and control access to the secure enterprise network.

In one embodiment, the secure enterprise network includes a plurality of client devices. A client device can be any network enabled device that includes an execution environment that is configured to support user applications, to store and manipulate data, and/or to receive and transmit information over a network, such as a LAN, WAN or the Internet. For example, the execution environment can include hardware, such as a processor, for processing instructions included in the user applications, a software OS, and a processor memory for storing at least a portion of the applications allowing the processor to access instructions and data included in the device. A client device can be, for example, a computer system, a work station, a data server, a web server, or the like.

According to an exemplary embodiment, each secure enterprise network includes a system that enables a client device in the secure enterprise network to provide terminal view access of the client device to another client device within or outside of the secure enterprise network without jeopardizing the security concerns of the secure enterprise network. Conversely, the system can also enable the client device in the secure enterprise network to receive terminal view access of another client device within or outside of the secure enterprise network without jeopardizing the security concerns of the secure enterprise network. Accordingly, the system can be configured to support two-way or multiple-way terminal view access, i.e., "reverse access" or "mesh access," among a plurality of secure enterprise networks that can be, for example, engaged in joint business projects.

In one embodiment, terminal view data can be defined as visual data corresponding to a desktop associated with a client device. For example, in the case of a user device, e.g., a desktop computer, terminal view data can include pixel data presented by a display device associated with the desktop computer. In another example, in the case of a service device, e.g., an application server, terminal view data can include visual data associated with a virtual desktop associated with the server.

The system, in one embodiment, is configured to receive a request for providing terminal view access of an internal client device in the secure enterprise network to another client device, and/or to receive a request for providing terminal view access of the other client device to the internal client device in the secure enterprise network. The request can be from the internal client device wishing to push or pull the terminal view data to or from the other client device, or from the other client device wishing to pull or push the terminal view data from or to the internal client device.

According to one embodiment, the system can perform a security check on the request before establishing a secure data transport channel between the other client device and the internal client device. The secure data transport channel can be configured to transport terminal view data and control commands between the client devices. Notably, the establishment of the secure data transport channel need not require other network infrastructure solutions or security measurements or adjustments, e.g., a VPN or web server overlay, for security bypass or network infrastructure traversal.

In one embodiment, once the data transport channel is established, the internal client device can provide terminal view data corresponding to a desktop associated with the client device over the secure data transport channel to the system, which then provides the data to the other client device so that the other client device can provide a visual representation of the desktop associated with the internal client device. Alternatively or additionally, the internal client device in the secure enterprise network can receive terminal view data of the other client device within or outside of the secure enterprise network from the system via the secure data transport channel. In high security environments, the secure data transport channel, in one embodiment, can be configured to transport only terminal view data and simple control commands and to block all other network protocols in the TCP/IP network. In this manner, each client device can display the other client device's desktop and submit control commands relating to displayed resources, but cannot transfer data into or transfer data out of the respective secure enterprise networks. In essence, each client device becomes a thin client with respect to the other client's secure enterprise network. Accordingly, each enterprise network is protected from malicious attacks launched by other client devices and, because enterprise resources always remain within the enterprise network, the opportunities for misappropriation are reduced.

Figure 2:
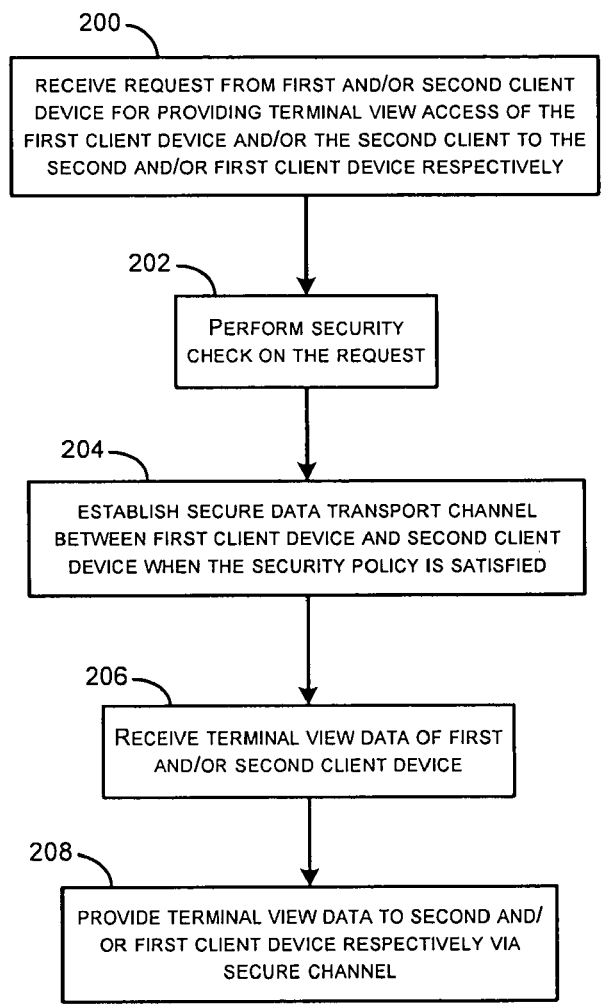
FIG. 2 is a flow diagram illustrating a method for providing terminal view access of a client device in a secure enterprise network according to an exemplary embodiment.
Figure 3:
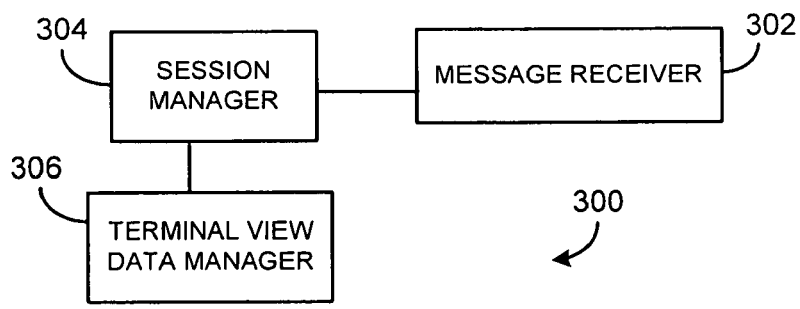
FIG. 3 is a block diagram illustrating an exemplary system for providing terminal view access of a client device in a secure enterprise network according to one exemplary embodiment.
Figure 4A:
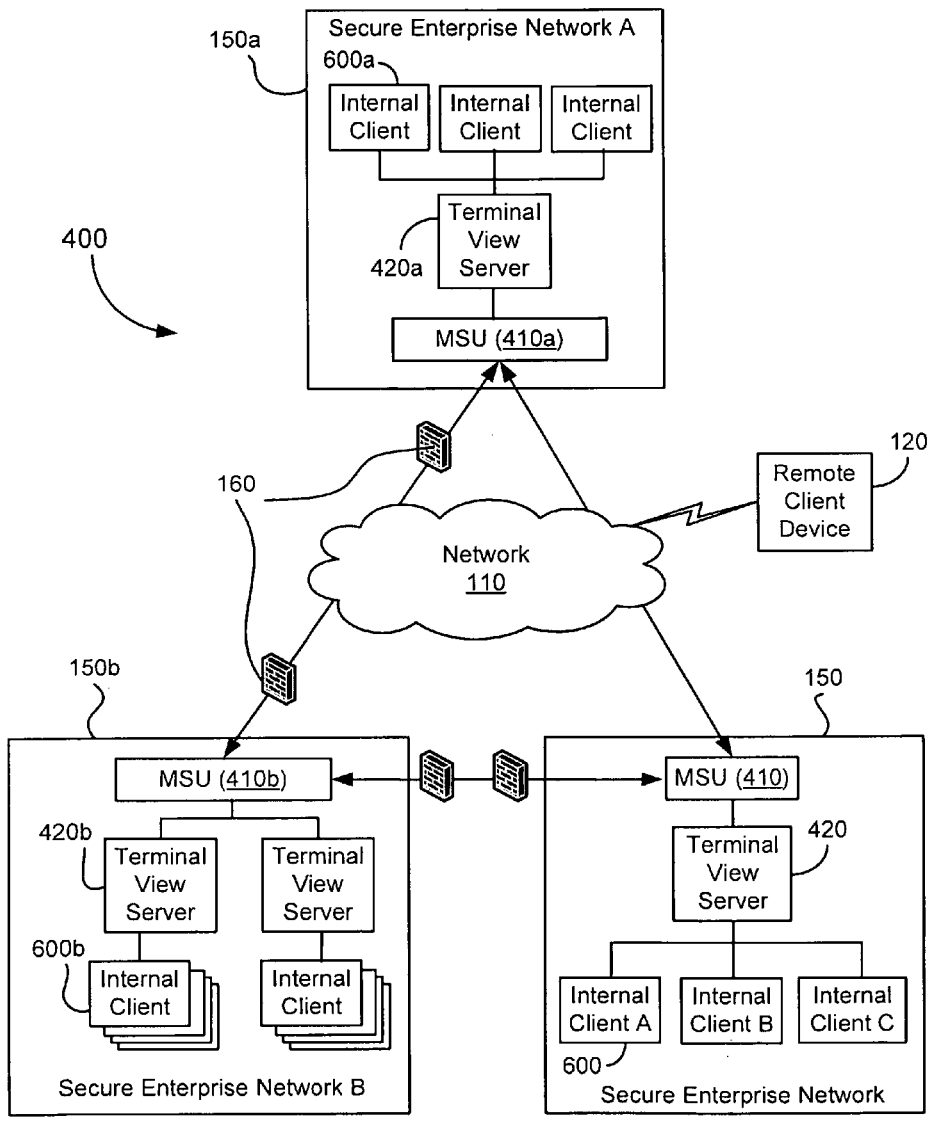
FIG. 4A and FIG. 4B are block diagrams illustrating another exemplary system for providing terminal view access of a client device in a secure enterprise network according to another embodiment.
Figure 4B:
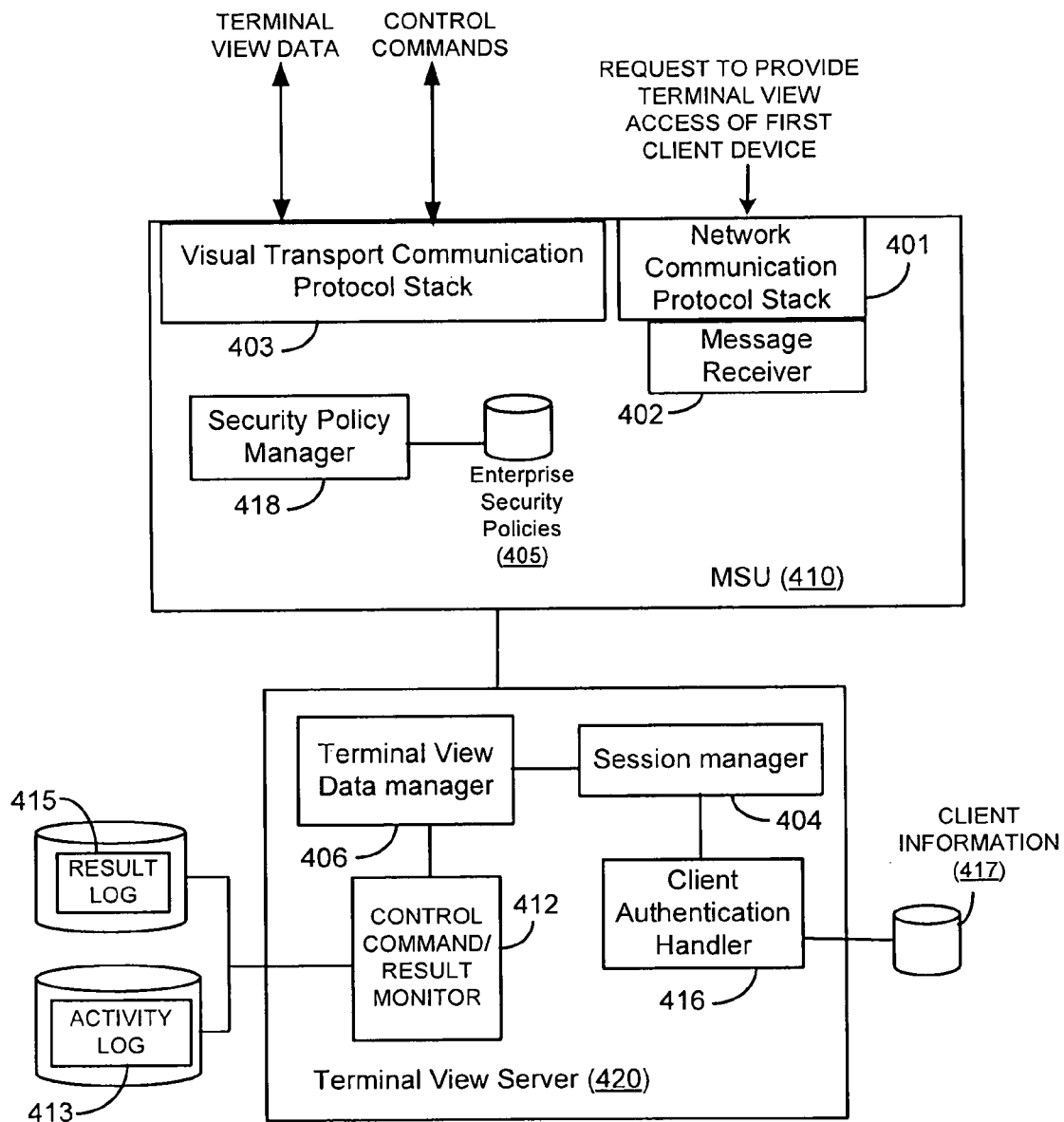
Figure 5A:
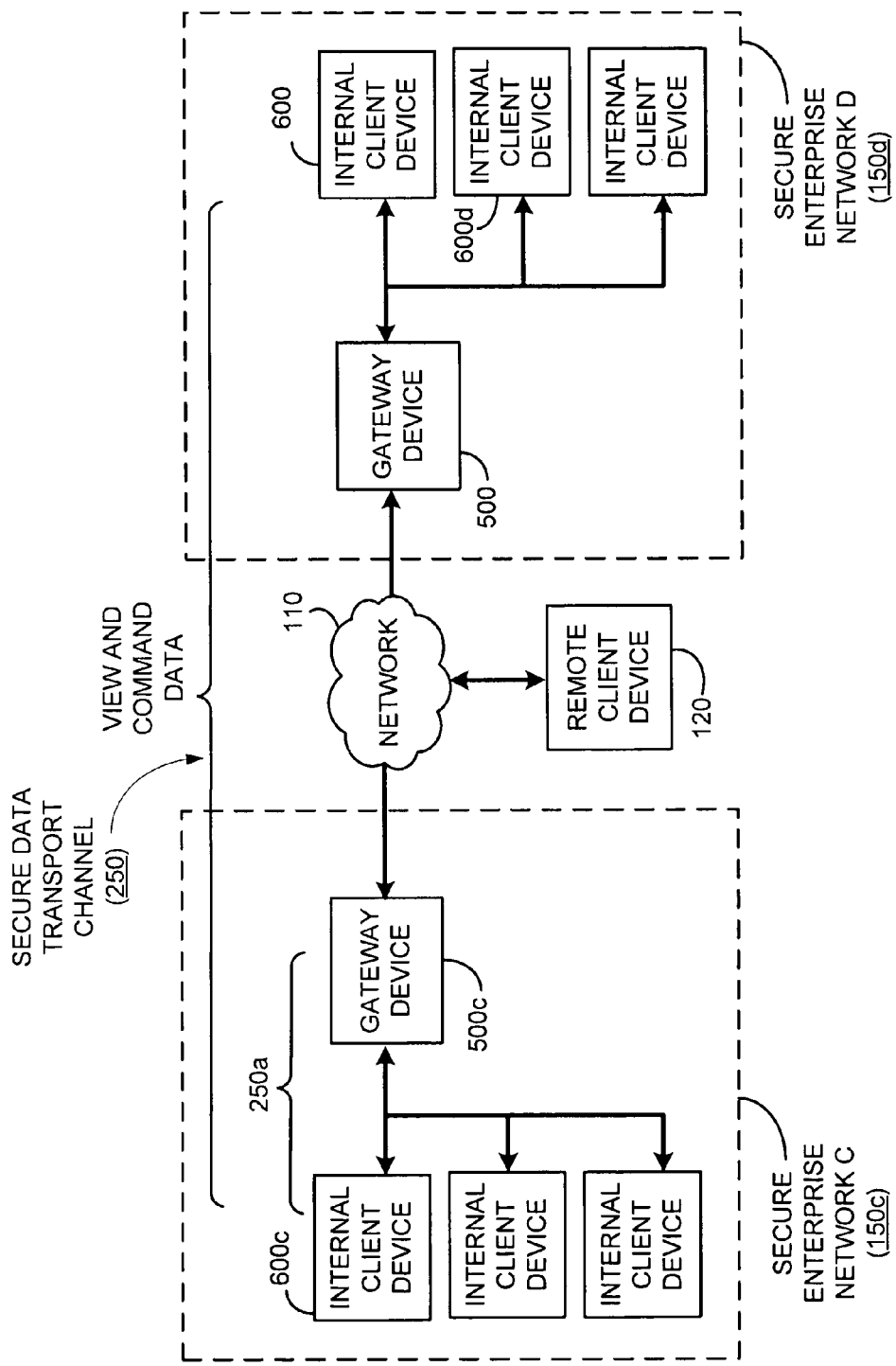
FIG. 5A and FIG. 5B are block diagrams illustrating another exemplary system for providing terminal view access of a client device in a secure enterprise network according to another embodiment.
Figure 5B:
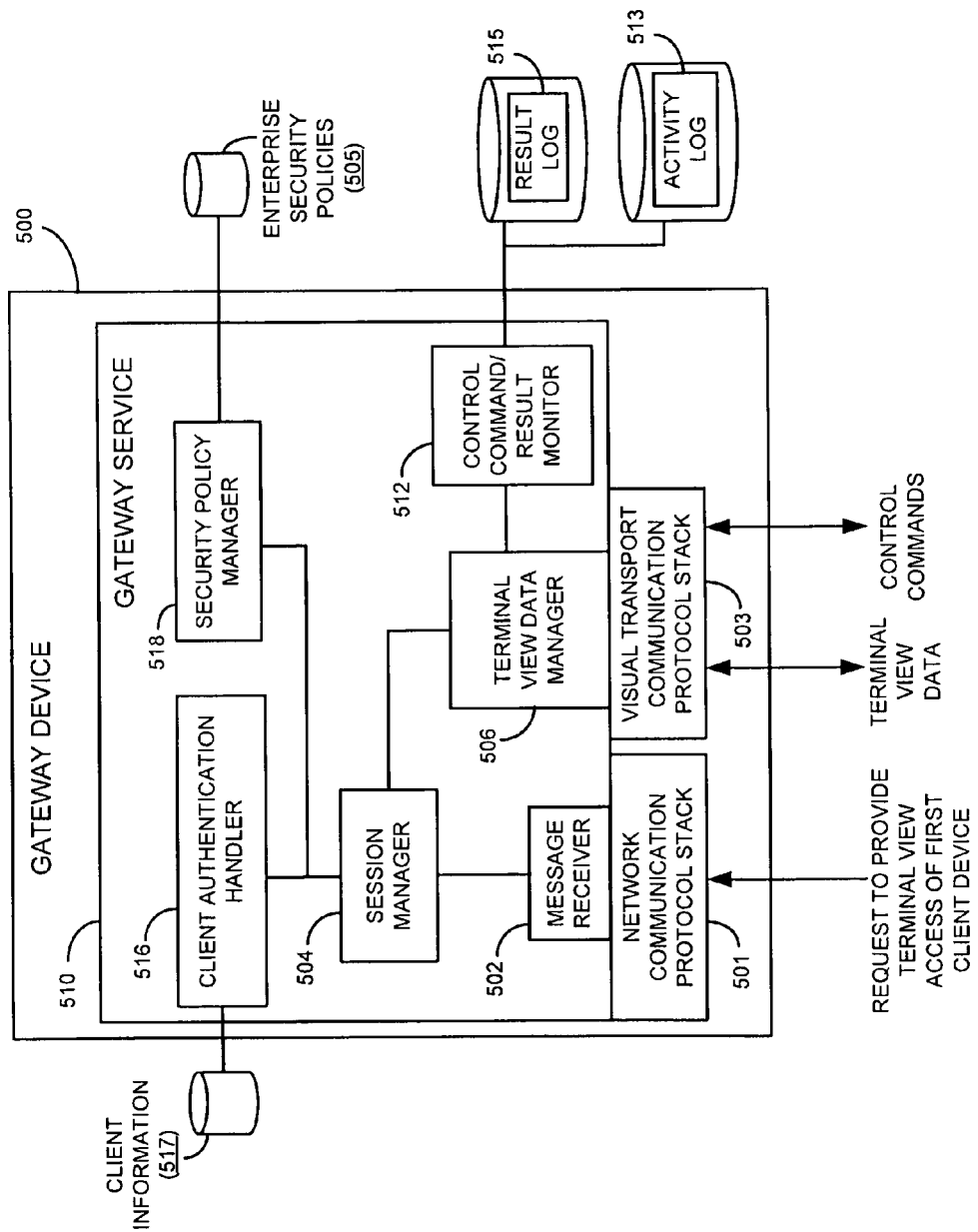

FIG. 2 is a flow diagram illustrating a method for providing terminal view access of a client device in a secure enterprise network according to an exemplary embodiment. FIGS. 3, 4A, 4B, 5A and 5B are block diagrams illustrating systems for providing terminal view access according to embodiments of the subject matter described herein. In particular, FIG. 3 illustrates an arrangement of components configured for providing terminal view access to a client device in a secure enterprise network, FIGS. 4A and 5A illustrate secure enterprise networks coupled to one another via a network where each secure enterprise network includes at least one device for hosting the arrangement of components of FIG. 3, and FIGS. 4B and 5B are block diagrams illustrating exemplary devices included in the systems of FIGS. 4A and 5A, respectively, for hosting the arrangement of components of FIG. 3.

In FIG. 4A, a plurality of secure enterprise networks 150, 150a, 150b are illustrated communicatively coupled to one another via a network 110, such as an intranet or LAN, or a public network, such as the Internet. Each enterprise network, e.g., 150, includes a plurality of internal clients 600, at least one terminal view server 420, and a multi-point switch unit (MSU) 410. Each internal client 600 can be registered on a terminal view server 420 such that the terminal view server 420 is aware of each of its internal clients 600 and can receive and provide terminal view data from and to each registered internal client 600. Each terminal view server 420 is in communication with the MSU 410.

According to one embodiment, the MSU 410 allows the terminal view servers 420 within the secure enterprise network 150 to communicate securely with one another. In addition, the MSU 410 is capable of communicating with an MSU 410b in another secure enterprise network, e.g., 150b, such that secure inter-network data exchange is facilitated. In this manner, a terminal view server 420 in one secure enterprise network 150 can exchange data with a terminal view server 420 in another secure enterprise network 150a via their respective MSUs 410, 410a. In one embodiment, the MSU 410 and/or the terminal view server 420 can be configured to support the operation of the arrangement of components 300 in FIG. 3, as is shown in FIG. 4B.

Although depicted as separate components in FIG. 4A and FIG. 4B, the MSU 410 and the terminal view server 420 can be integrated into one component, such as a gateway device depicted in FIG. 5A. As is shown, each secure enterprise network 150c, 150d includes a plurality of internal client devices 600c, 600 configured to send and receive information to and from a gateway device 500c, 500. The gateway device 500 can reside outside of firewalls (not shown) protecting the secure enterprise network 150d and can be in a perimeter network (not shown) surrounding the enterprise network 150d or in the network 110. According to one embodiment, the gateway device 500 can be accessed over a public network 110 by another client device, such as a remote client device 120 or an internal client device 600c in another secure enterprise network 150c, or over a private network by another internal client device 600d in the same secure enterprise network 150d. The gateway device 500 can also be protected by at least one firewall (not shown). In one embodiment, the gateway device 500 can be configured to support the operation of the arrangement of components 300 in FIG. 3, as is shown in FIG. 5B.

Referring to FIG. 2, in block 200, a request for providing terminal view access of a first client device within a secure enterprise network to a second client device and/or a request for providing terminal view access of the second client device to the first client device is received from the first client device and/or the second client device. According to an exemplary embodiment, a system for providing terminal view access of a client device in a secure enterprise network includes means for receiving the request. For example, FIG. 3 depicts a message receiver 302 configured for receiving a request from at least one of a first client device 600 within the secure enterprise network 150d and a second client device, the request for at least one of providing terminal view access of the first client device to the second client device, and providing terminal view access of the second client device to the first client device in the secure enterprise network. In one embodiment, the second client device can be a remote client device 120, another internal client device 600c of another secure enterprise network 150c, or another internal client device 600d of the same secure enterprise network 150d.

FIG. 4B illustrates an exemplary system that hosts the arrangement of components 300 adapted for operating within an execution environment of the MSU 410 and the terminal view server 420 according to one embodiment, while FIG. 5B illustrates an exemplary gateway device 500 that hosts the arrangement of components 300 adapted for operating within an execution environment of gateway device 500 according to another embodiment. As stated above, each exemplary execution environment includes a processor memory for storing instructions and data included in the MSU 410, the server 420, and/or the gateway device 500, a processor for accessing instructions and data in the processor memory for processing, and a network subsystem for communication over a network. Each execution environment can also include accessible persistent storage for storing data and instructions when not needed for processing, and an operating system for managing various hardware and software components required for hosting the components in the MSU 410, the server 420, and/or the gateway device 500.

In one embodiment, the MSU 410 and terminal view server 420, and the gateway device 500 can be configured to manage terminal view access of internal client devices 600 in the respective secure enterprise network 150, 150d. According to one embodiment, a gateway service 510 hosted by the gateway device 500 includes a message receiver 502 configured for receiving via a network communication protocol stack component 501 the request from the network 110, as when the requesting device is the remote client device 120, or via a private network, as when the requesting device is the first client device 600 or an internal client device in the same enterprise network 150d. Similarly, the MSU 210 can include a message receiver 402 configured for receiving the request from the network 110 via a network communication protocol stack component 401 or from within via a private network according to another embodiment.

Referring again to FIG. 2, when the request is received, a security check is performed on the request to enforce a security policy of the secure enterprise network 150, 150d in block 202. According to an exemplary embodiment, the system for providing terminal view access of a client device in a secure enterprise network includes means for performing the security check on the request. For example, FIG. 3 depicts a session manager component 304 configured for performing a security check on the request to enforce a security policy of the secure enterprise network 150.

In the MSU 410 in one embodiment, and in the gateway service 510 in another embodiment, the message receiver 402, 502 can pass the request to a session manager component 404, 504. In one embodiment, the session manager component 404, 504 can invoke a client authentication handler component 416, 516 to authenticate the second client device, e.g., 120. In one embodiment, client information 417, 517, including authentication information, associated with the second client device 120 can be stored locally, as shown, or on a different server and retrieved by the client authentication handler component 416, 516.

Alternatively or additionally, the session manager component 404, 504 can call a security policy manager component 418, 518 to check security policies of the enterprise 405, 505 associated with the secure enterprise network 150, 150d to determine whether the second client device 120 is authorized to receive the terminal view data associated with the first client device 600 and/or provide terminal view data associated with the second client device 120 to the first client device 600.

The security policies 405, 505 can be based on at least one of a remote user, the second client device 120 and a characteristic of the user or second client device 120, i.e., a role-based security policy. For example, a security policy can grant independent contractors limited terminal view access of certain internal client devices 600, whereas another security policy can grant senior vice presidents of the enterprise unlimited terminal view access. The security policies of the enterprise 405, 505 can be stored locally, as shown, or on a different server. In either embodiment, the enterprise's security policies 405, 505 can be enforced at a single-point of entry, thereby simplifying security implementation.

Referring again to FIG. 2, when the security policy is satisfied, a secure data transport channel 250, depicted in FIG. 5A, can be established between the first client device 600 and the second client device 120. According to one embodiment, the data transport channel 250 is configured to transport terminal view data and to communicatively connect the first client device 600 and the second client device 120 over at least one of a public network 110, a private network, and a firewall. The system for providing terminal view access of a client device in a secure enterprise network includes means for establishing the secure data transport channel 250. For example, the session manager component 304 can be configured for establishing the secure data transport channel 250 between the first client device 600 and the second client device 120 when the security policy is satisfied.

According to an exemplary embodiment, when the security policy is satisfied, the session manager component 404, 504 in the terminal view server 420 or in the gateway service 510 can create a communication session and instruct a terminal view data manager 406, 506 to establish the secure data transport channel 250. Alternatively or additionally, when the security policy is satisfied, the session manager component 404, 504 can be configured to send the request to the first client device 600, as when the second client device 120 is requesting to receive or provide terminal view access, and/or to the second client device 120, as when the first client device 600 is requesting to provide or receive terminal view access, so that the request can be evaluated. In this embodiment, the session manager component 404, 504 can instruct the terminal view data manager 406, 506 to establish the secure data transport channel when the request is granted.

A session identifier (ID) can be associated with the communication session, the second client device 120, and the first client device 600. In one embodiment, a portion of the secure data transport channel 250, for example a portion 250a between the gateway device 500 and the first client device 600, can be a persistent connection. That is, the life of the portion of the channel 250a need not be session-based and can be maintained to support several sessions, thereby for example, allowing the first client device 600 to provide terminal view access simultaneously to more than one client device 120.

In one embodiment, the secure data transport channel 250 supports Secure Sockets Layer (SSL)—based visual transport protocols and allows only visual data and basic control commands to be transported between the first client device 600 and the second client device 120. In another embodiment, the secure data transport channel 250 can allow other types of data to be transmitted, such as static computer files or data base files, dynamic datagram or command streams generated by specifically allowed application software or client-server tools.

Figure 6:
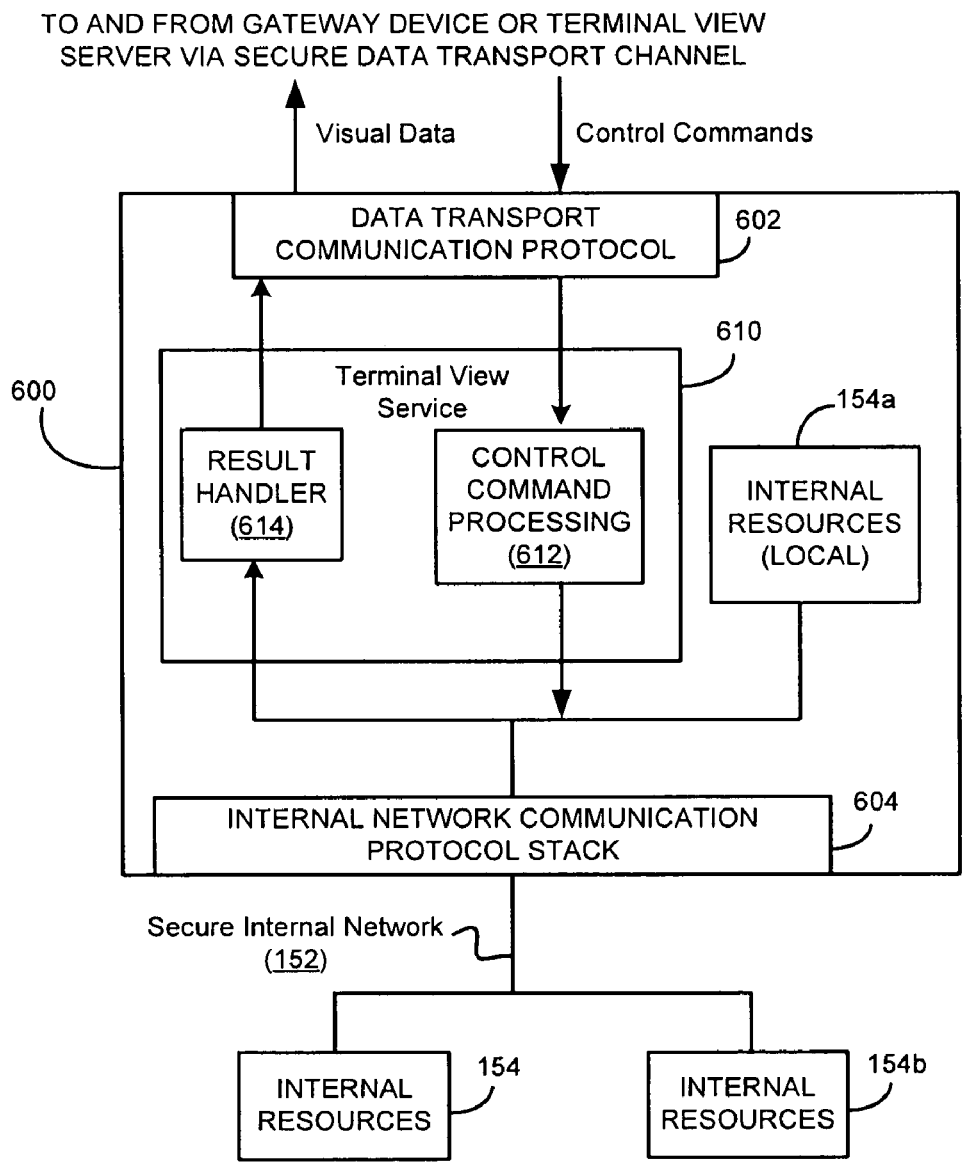
FIG. 6 is a block diagram of an exemplary client device according to one embodiment.

According to one embodiment, when the secure data transport channel 250 is established, the first client device 600 can receive from the gateway device 500 a notification that a secure data transport channel 250 has been established between the first client device 600 and the second client device 120 via the MSU 410 and terminal view server 420, or the gateway device 500. FIG. 6 is a block diagram of an exemplary client device 600 that hosts an arrangement of components adapted for operating within an execution environment of the client device 600 according to one embodiment. In this embodiment, the client device 600 includes a terminal view service module 610 that is configured to receive the notification via a data transport communication protocol stack component 602.

In response to receiving the notification, the first client device 600 can be configured to send or receive terminal view data corresponding to a desktop associated with the first client device 600 or associated with the second client device 120, respectively, to or from the terminal view server 420 or the gateway device 500 via the secure data transport channel 250. In one embodiment, the first client device 600 has access to at least one internal resource 154 within the secure enterprise network 150d. For example, the first client device 600 can host an internal resource locally 154a and/or be coupled to internal resources 154, 154b over a secure internal network 152. The secure internal network 152 can support common network protocols such as, for example, TCP/IP communication protocols.

Accordingly, the first client device 600 can be configured to access the internal resources 154 directly or via the secure internal network 152. According to one embodiment, the desktop associated with the first client device 600 can depict at least one of the internal resources 154 to which the first client device 600 has access. Accordingly, the terminal view service 610 can be configured to send terminal view data corresponding to the at least one internal resource 154 to the terminal view server 420 or gateway device 500 using the data transport communication protocol stack 602.

Referring again to FIG. 2, the terminal view data corresponding to a desktop associated with the first client device and/or the second client device is received from the first client device 600 and/or the second client device 120 respectively, via the data transport channel 250 in block 206, and is provided to the second client device 120 and/or the first client device 600, respectively, via the secure data transport channel in block 208 so that the second client device is provided a visual representation of the desktop associated with the first client device 600 and/or the first client device is provided a visual representation of the desktop associated with the second client device 120. According to an exemplary embodiment, the system for providing terminal view access of a client device in a secure enterprise network includes means for receiving the terminal view data from the first 600 and/or second 120 client device and for providing the received terminal view data to the respective second 120 or first 600 client device via the data transport channel 250. For example, FIG. 3 depicts a terminal view data manager 306 configured for receiving and providing the terminal view data.

In the terminal view server 420 and the gateway service 510, the terminal view data manager 406, 506 can receive the terminal view data from the first 600 and/or second 120 client device and can determine with which session the terminal view data is associated based on, for example, the session ID included with the terminal view data. Once the session is determined, the terminal view data manager 406, 506 can, in one embodiment, send the terminal view data to the respective second 120 and first 600 client device associated with the session over the secure data transport channel 250 using a visual transport communication protocol stack 403, 503.

As stated above, in one embodiment, the terminal view data corresponding to the desktop associated with the first client device 600 can depict at least one of the internal resources 154 to which the first client device 600 has access. Accordingly, the second client device 120 can be provided visual access to the at least one resource 154 in the secure enterprise network 150d while the resource 154 remains protected within the enterprise 150d.

According to one embodiment, once the terminal view data corresponding to the desktop associated with the first client device 600 is presented by the second client device 120, control commands associated with the at least one internal resource 154, such as mouse actions and key strokes, can be submitted to access the resource 154. In essence, the second client device 120 becomes a thin client with respect to the first client device's secure enterprise network 150d because the second client device 120 can receive only terminal view data and can only send control commands.

In one embodiment, the terminal view data manager 406, 506 can be configured to receive a control command from the second client device 120 via the data transport channel 250. The control command can be a key stroke, a mouse action, e.g., right-click or left-click on an icon, a voice command or any other command submitted by a user via the second client device 120. For example, the user can move the mouse to place a pointer on a displayed icon corresponding to the at least one resource 154 in the secure enterprise 150 and then double-click on the icon to send a message that includes a control command to open the resource 154.

In one embodiment, the control command can be received by the terminal view data manager 406, 506 over a public network 110, e.g., the Internet, and/or a private network via the secure data transport channel 250. For example, the terminal view data manager 406, 506 can receive the control command from the second client device 120 via the visual transport communication protocol stack 403, 503.

In one embodiment, the control command can be associated with the internal resource 154 accessible by the first client device 600 and therefore information identifying the associated resource 154 can be received along with the command. In addition, information identifying the session and, optionally, information identifying the second client device 120 can be received. Using this information, the terminal view data manager 406, 506 can determine to which client device 600 the control command should be sent, and can send the control command to the first client device 600 via the data transport channel 250 using the visual transport communication protocol stack 403, 503.

In an exemplary embodiment, the terminal view data manager 406, 506 also can pass the control command to a control command/result monitor component 412, 512, which records the control command in an activity log 413, 513 and stores the log 413, 513 in a data store for auditing purposes. In this manner, every key stroke and mouse action can be recorded and analyzed to determine access patterns, abuse or other activities.

According to one embodiment, the first client device 600 can receive the control command from the second client device 120 via the established secure data transport channel 250. For example, the terminal view service 610 in the first client device 600 can receive the control command via a data transport communication protocol stack 602. In one embodiment, the terminal view service 610 can include a control command processing component 612 configured for receiving the control command and for processing the control command on the associated internal resource 154.

The control command processing component 612 can create, in one embodiment, an instruction based on the received control command and send the instruction to the associated resource 154. For instance, suppose the control command is one to retrieve specific data from the associated internal resource 154, e.g., a database server. The control command processing component 612 can be configured to create an instruction that can include the control command and/or some form of the control command, which when executed against the internal resource 154, returns the specified data.

The control command can be sent directly to the associated resource 154a when the resource 154a is hosted by the first client device 600 or can be sent via the secure internal network 152 using the internal network communication protocol stack 604 when the associated resource 154 is accessed over the network 152. As stated above, the secure internal network 152 supports network traffic using an internal network communication protocol, such as a TCP/IP communication protocol. In one embodiment, while the internal TCP/IP network traffic flows to, from and between the first client device 600 and internal resources 154 via the secure internal network 152, such traffic terminates at the first client device 600, i.e., does not flow out from the first client device 600 to the terminal view server 420 or the gateway device 500. In other words, such traffic and the associated protocols used are not transported directly to the second client device 120.

According to an exemplary embodiment, when the control command is executed against the associated internal resource 154, a result of the processing of the control command is generated. The result can be transmitted directly to the terminal view service 610 when the resource 154a is hosted by the first client device 600 or via the secure internal network 152 and the internal network communication protocol stack 604 when the associated resource 154 is on the network 152.

In one embodiment, terminal view data corresponding to the result of the processing of the control command is sent from the terminal view service 610 in the internal client device 600 to the terminal view server 420 or the gateway device 500 via the secure data transport channel 250. The terminal view service 610 can include, in one embodiment, a result handler component 614 that receives the result from the internal resource 154, and prepares terminal view data corresponding to the result for transmission over the secure data transport channel 250. For example, when the control command is associated with a file folder application and the command is to open a folder, the result of the processing of the control command can display a window including a list of files that are stored in the folder. The result handler component 614 can prepare the terminal view data corresponding to the displayed window so that it can be sent to the terminal view server 420 or the gateway device 500 using the data transport communication protocol stack 602.

The terminal view data corresponding to the result of the processing of the control command is received by the terminal view server 420 or the gateway device 500 and is provided to the second client device 120 via the secure data transport channel 250 so that the result can be presented at the second client device 120. For example, as described above, the terminal view data manager 406, 506 can receive the terminal view data from the first client device 600 and can, in one embodiment, send the terminal view data to the second client device 120 using the visual transport communication protocol stack 403, 503. In addition, the terminal view data manager 406, 506 can pass the terminal view data corresponding to the result to the control command/result monitor component 412, 512, which records the result in a result log 415, 515 and stores the log 415, 515 in the data store for auditing purposes. In this manner, every result returned to a second client device 120, as well as every key stroke and mouse action, can be recorded and analyzed to determine access patterns, abuse or other activities.

According to aspects of the embodiments described, a secure data transport channel 250 communicatively connects a second client device 120 to a first client device 600 within a secure enterprise network 150, 150d via at least one of a gateway device 500, an MSU 410, and a terminal view server 420 of the secure enterprise network 150, 150d. In one embodiment, the secure data transport channel 250 can traverse a public network 110 and/or a private network and through at least one firewall 160 protecting the secure enterprise network 150, 150d. The secure data transport channel 250, in one embodiment, supports a visual data transport communication protocol so that terminal view data corresponding to a desktop associated with the first client device in the secure enterprise network 150 or associated with the second client device can be provided from or to the first client device 600 to or from the terminal view server 420 or the gateway device 500. The terminal view data received from the first client device 600 and/or the second client device 120 can be provided respectively to the second client device 120 or the first client device 600 for presentation.

In exemplary embodiments, the second client device 120 can be provided visual access to secure resources 154, such as applications and data, accessible by the first client device 600 without establishing a VPN tunnel into the secure enterprise network 150. While the second client device 120 can display and submit control commands against the internal resources 154, the second client device 120 cannot use other network protocols, such as but not limited to, secure FTP or SSH in TCP/IP network, to transfer data into or out of the secure enterprise network 150. Thus, unlike VPN based solutions, the secure enterprise network 150 is protected from malicious attacks from the second client device 120. Moreover, information leakage concerns are minimized because the data stays within the secure enterprise network 150. Unlike conventional terminal service-based solutions, e.g., using a presentation server, the second client device 120 is able to access the internal client devices 600 over the network 110 and through firewalls 160 protecting the secure enterprise network 150 without implementing VPN technology or any web service overlay solution.

In one embodiment, the terminal view server 420 and the gateway service 510 can be configured to support a plurality of access sessions associated with a plurality of second client devices 120 and at least one first client device 600. For example, the gateway service 510 can receive a request from a third client device, e.g., 600c, for terminal view access of a fourth client device 600d in the secure enterprise network 150d. In response, the session manager component 504 can create a second session associated with the third client device 600c and direct the terminal view data manager 506 to establish a secure data transport channel 250 between the third client device 600c and the fourth client device 600d. Terminal view data corresponding to a desktop associated with the fourth client device 600d can be received and provided to the third client device 600c over the secure data transport channel 250 via the gateway device 500.

In other embodiments, more than one client device 120, 600c can be associated with a single communication session and the first client device 600. For example, suppose the second client device 120 and the first client device 600 are associated with a first session. In one embodiment, the gateway device 500 can receive a request from a third client device 600c to join the first session. After authenticating and authorizing the third client device 600c, and optionally receiving the approval of the second client device 120, the session manager component 504 can associate the third client device 600c with the first session. Accordingly, when the terminal view data is provided from the first client device 600 to the gateway device 500 via the secure data transport channel 250, the terminal view data manager 506 can send the terminal view data to all client devices 120, 600c associated with the first session through a synchronous multi-cast function.

In another embodiment, the first client device 600 can establish a plurality of secure data transport channels 250 with a plurality of gateway devices 500. For example, in one embodiment, one secure enterprise network 150 can include a plurality of gateway devices 500 for purposes of load balancing and/or redundancy, and each internal client device 600 can be communicatively connected to the gateway devices 500 by a secure data transport channel 250. In another embodiment, a gateway device 500 can provide terminal view access of internal client devices 600c, 600d in a plurality of secure enterprise networks 150c, 150d. The secure enterprise networks 150c, 150d can be affiliated with a common enterprise or each can be affiliated with a different enterprise. In the later case, the gateway device 500 can store the securities policies of more than one enterprise and therefore, enforce different security policies for different secure enterprise networks 150c, 150d.

In one embodiment, the second client device 120, the gateway device 500, and the secure enterprise networks 150c, 150d can be affiliated with a first enterprise such that the gateway device 500 can serve as a single-point security policy enforcer for the first enterprise. In other embodiments, remote cross-domain access is also feasible and easily implemented. For example, a third client device 600c in a second enterprise network 150c can acquire terminal view access to sensitive data in the first secure enterprise network 150d so long as the third client device 600c is authorized to have such access, e.g., because the first and second enterprises have a partnership or other collaborative relationship.

In this embodiment, a second gateway device 500c affiliated with the second enterprise 150c can create a session for the third client device 600c when security policies of the second enterprise network 150c are satisfied, and send a request to the first gateway device 500 for providing terminal view access of the first client device 600 in the first secure enterprise network 150d. In response, the first gateway device 500 can create the session and establish a secure data transport channel 250 between the third client device 600c and the first client device 600 via the first 500 and second 500c gateway devices when the security policies of the first enterprise network 150*d* are satisfied. Accordingly, the terminal view data from the first client device 600 can be received by the first gateway device 500 and be sent to the third client device 600*c* via the second gateway device 500*c*. In this manner, two secure enterprise networks 150*c*, 150*d* that can be controlled by two different companies or entities can be federated with one another to exchange terminal view data in a secure and protected environment.

Alternatively, when the first client device 600 sends the request to the first gateway device 500 for providing terminal view access of the first client device 600 to the third client device 600*c*, the first gateway device 500 and the second gateway device 500*c* can create the session and establish a secure data transport channel 250 between the third client device 600*c* and the first client device 600 when the security policies of the first 150*d* and second 150*c* enterprise networks are satisfied. For example, the second gateway device 500*c* can perform a security check prior to establishing the secure data transport channel 250 and/or prior to providing the terminal view data corresponding to the desktop associated with the first client device 600 to the third client device 600*c*. In this manner, the security policies of each secure enterprise network 150, 150*c*, 150*d* can be enforced prior to receiving and/or providing terminal view access of a client device 600.

Several exemplary embodiments described above demonstrate the scalability and flexibility provided by the methods and systems described herein. Those skilled in the art will readily recognize that other configurations can be easily implemented using the principles discussed herein. Accordingly, the subject matter disclosed is not intended to be limited only to the embodiments described.

Through aspects of the embodiments described, secure inter-network terminal view access of internal client devices 600 in secure enterprise networks 150 can be provided. It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the methods described herein can be embodied in executable instructions stored in a computer readable medium for use by or in connection with an instruction execution machine, system, apparatus, or device, such as a computer-based or processor-containing machine, system, apparatus, or device. As used here, a "computer readable medium" can include one or more of any suitable media for storing the executable instructions of a computer program in one or more of an electronic, magnetic, optical, electromagnetic, and infrared form, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein can be embodied in many different forms, and all such forms are contemplated to be within the scope of what is claimed. It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for providing terminal view access of a client device in a secure enterprise network, the method comprising:

receiving by a first gateway device communicatively coupled to a plurality of first client devices in a first secure enterprise network a request from a first client device within the first secure enterprise network, the request for at least one of providing terminal view access of the first client device in the first secure enterprise network to a second client device in a second secure enterprise network, and providing terminal view access of the second client device in the second secure enterprise network to the first client device in the first secure enterprise network, wherein the second secure enterprise network is an independently operated entity from the first secure enterprise network;

performing by the first gateway device a security check on the request to enforce a security policy of the first secure enterprise network prior to sending the request to a second gateway device communicatively coupled to a plurality of second client devices including the second client device in the second secure enterprise network;

in response to receiving by the second gateway device the request from the first gateway device, performing by the second gateway device a security check on the request to enforce a security policy of the second secure enterprise network;

establishing by the first gateway device and the second gateway device a secure data transport channel between the second client device and the first client device via the first gateway device and the second gateway device, wherein the data transport channel is configured to transport terminal view data and to communicatively connect the first client device and the second client device over at least one of a public network, a private network and a firewall via the first and second gateway devices;

receiving by the first and second gateway devices terminal view data from at least one of the first client device and the second client device via the data transport channel, the terminal view data corresponding to a desktop associated with at least one of the first client device and the second client device, respectively; and providing by the first and second gateway devices the terminal view data received from at least one of the first client device and the second client device to at least one of the second client device and the first client device, respectively, via the data transport channel so that terminal view data is shared between first and second client devices across first and second secure enterprise networks after security policies of each secure enterprise network are enforced, wherein performing the security check by the second gateway device includes authenticating the second client device and determining that the second client device is authorized to at least one of receive terminal view data associated with the first client device within the first secure enterprise network and provide terminal view data associated with the second client device based on the security policy of the second secure enterprise network.

2. The method of claim 1 further comprising:
sending by the second gateway device the request to, and establishing by the first and second gateway devices the secure data transport channel after receiving from the second client device an indication that the request is granted.

3. The method of claim 1 wherein the terminal view data from the first client device is presented in the second client device, the method further comprising:
receiving by the first and second gateway devices via the data transport channel a control command from the second client device;
sending by the first and second gateway devices the control command to the first client device via the data transport channel;
receiving by the first and second gateway devices terminal view data from the first client device, the terminal view data corresponding to a result of a processing of the control command; and
providing by the first and second gateway devices the terminal view data to the second client device via the data transport channel so that the result of the processing of the command control is presented at the second client device.

4. The method of claim 3 wherein the control command is associated with an internal resource accessible by the first client device via a secure internal network that supports internal TCP/IP network traffic, and all internal TCP/IP network traffic received by the first client device from the internal resource terminates at the first client device.

5. The method of claim 3 wherein the control command comprises at least one of a mouse input and a keyboard input, and wherein the method further includes recording by at least one of the first and second gateway devices the control command in an activity log and storing the activity log for auditing purposes.

6. The method of claim 1 wherein the data transport channel is configured to transport input control commands and terminal view data only.

7. The method of claim 1 wherein the security policy of at least one of the first and second secure enterprise network comprises a policy based on at least one of the first client device, the second client device, a first user of the first client device, a second user of the second client device, and a characteristic of at least one of the first user and the second user.

8. The method of claim 1 wherein performing the security check by the first gateway device includes authenticating the first client device and determining that the first client device is authorized to at least one of provide terminal view data associated with the first client device to the second client device within the second secure enterprise network and provide terminal view data associated with the second client device to the first client device based on the security policy of the first secure enterprise network.

9. A system for providing terminal view access of a client device in a secure enterprise network, the system comprising:
a first message receiver in a first gateway device communicatively coupled to a plurality of first client devices in a first secure enterprise network, the message receiver configured for receiving a request from a first client device within the first secure enterprise network, the request for at least one of providing terminal view access of the first client device in the first secure enterprise network to a second client device in a second secure enterprise network, and providing terminal view access of the second client device in the second secure enterprise network to the first client device in the first secure enterprise network, wherein the second secure enterprise network is an independently operated entity from the first secure enterprise network;
a first session manager component in the first gateway device configured for performing by the first gateway device a security check on the request to enforce a security policy of the first secure enterprise network prior to sending the request to a second gateway device communicatively coupled to a plurality of second client devices including the second client device in the second secure enterprise network;
a second message receiver in the second gateway device configured for receiving the request from the first gateway device;
a second session manager component in the second gateway device configured for performing a security check on the request to enforce a security policy of the second secure enterprise network, wherein the first and second session manager components are configured for establishing by the first gateway device and the second gateway device a secure data transport channel between the second client device and the first client device via the first gateway device and the second gateway device, wherein the data transport channel is configured to transport terminal view data and to communicatively connect the first client device and the second client device over at least one of a public network, a private network and a firewall via the first and second gateway devices; and
a first terminal view data manager in the first gateway device and a second terminal view data manager in the second gateway device, the first and second terminal view data managers configured for receiving terminal view data from at least one of the first client device and the second client device via the data transport channel, the terminal view data corresponding to a desktop associated with at least one of the first client device and the second client device, respectively, and for providing the terminal view data received from at least one of the first client device and the second client device to at least one of the second client device and the first client device, respectively, via the data transport channel so that terminal view data is shared between first and second client devices across first and second secure enterprise networks after security policies of each secure enterprise network are enforced, wherein the second session manager component is further configured for authenticating the second client device and determining that the second client device is authorized to at least one of receive terminal view data associated with the first client device within the first secure enterprise network, and provide terminal view data associated with the second client device to the first client device based on the security policy of the second secure enterprise network.

10. The system of claim 9 wherein the second session manager component in the second gateway device is further configured for sending the request to the second client device, and establishing the secure data transport channel after receiving from the second client device an indication that the request is granted.

11. The system of claim 9 wherein the terminal view data from the first client device is presented in the second client device and the first and second terminal view data managers in the first and second gateway devices, respectively, are further configured for receiving via the data transport channel a control command from the second client device, for sending the control command to the first client device via the data transport channel, for receiving terminal view data from the first client device, the terminal view data corresponding to a result of a processing of the control command, and for providing the terminal view data to the second client device via the data transport channel.

12. The system of claim 11 wherein the control command is associated with an internal resource accessible by the first client device via a secure internal network that supports internal TCP/IP network traffic, and all internal TCP/IP network traffic received by the first client device from the internal resource terminates at the first client device.

13. The system of claim 11 wherein the control command comprises at least one of a mouse input and a keyboard input, and wherein at least one of the first and second terminal view data managers is further configured for recording the control command in an activity log and storing the activity log for auditing purposes.

14. The system of claim 9 wherein the data transport channel is configured to transport input control commands and terminal view data only.

15. The system of claim 9 wherein the security policy of at least one of the first and second secure enterprise network comprises a policy based on at least one of the first client device, the second client device, a first user of the first client device, a second user of the second client device, and a characteristic of at least one of the first user and the second user.

16. The system of claim 9 wherein the first session manager component is further configured for authenticating the first client device and determining that the first client device is authorized to at least one of provide terminal view data associated with the first client device to the second client device within the second secure enterprise network, and provide terminal view data associated with the second client device to the first client device based on the security policy of the first secure enterprise network.

17. A non-transitory computer readable medium containing a computer program, executable by a machine, for providing terminal view access of a client device in a secure enterprise network, the computer program comprising executable instructions for:

receiving by a first gateway device communicatively coupled to a plurality of first client devices in a first secure enterprise network a request from a first client device within the first secure enterprise network, the request for at least one of providing terminal view access of the first client device in the first secure enterprise network to a second client device in a second secure enterprise network, and providing terminal view access of the second client device in the second secure enterprise network to the first client device in the first secure enterprise network, wherein the second secure enterprise network is an independently operated entity from the first secure enterprise network;

performing by the first gateway device a security check on the request to enforce a security policy of the first secure enterprise network prior to sending the request to a second gateway device communicatively coupled to a plurality of second client devices including the second client device in the second secure enterprise network;

in response to receiving by the second gateway device the request from the first gateway device, performing by the second gateway device a security check on the request to enforce a security policy of the second secure enterprise network;

establishing by the first gateway device and the second gateway device a secure data transport channel between the second client device and the first client device via the first gateway device and the second gateway device, wherein the data transport channel is configured to transport terminal view data and to communicatively connect the first client device and the second client device over at least one of a public network, a private network and a firewall via the first and second gateway devices;

receiving by the first and second gateway devices terminal view data from at least one of the first client device and the second client device via the data transport channel, the terminal view data corresponding to a desktop associated with at least one of the first client device and the second client device, respectively; and providing by the first and second gateway devices the terminal view data received from at least one of the first client device and the second client device to at least one of the second client device and the first client device, respectively, via the data transport channel so that terminal view data is shared between first and second client devices across first and second secure enterprise networks after security policies of each secure enterprise network are enforced, wherein performing the security check by the second gateway device includes authenticating the second client device and determining that the second client device is authorized to at least one of receive terminal view data associated with the first client device within the first secure enterprise network and provide terminal view data associated with the second client device based on the security policy of the second secure enterprise network.

* * * * *